UNITED STATES PATENT OFFICE.

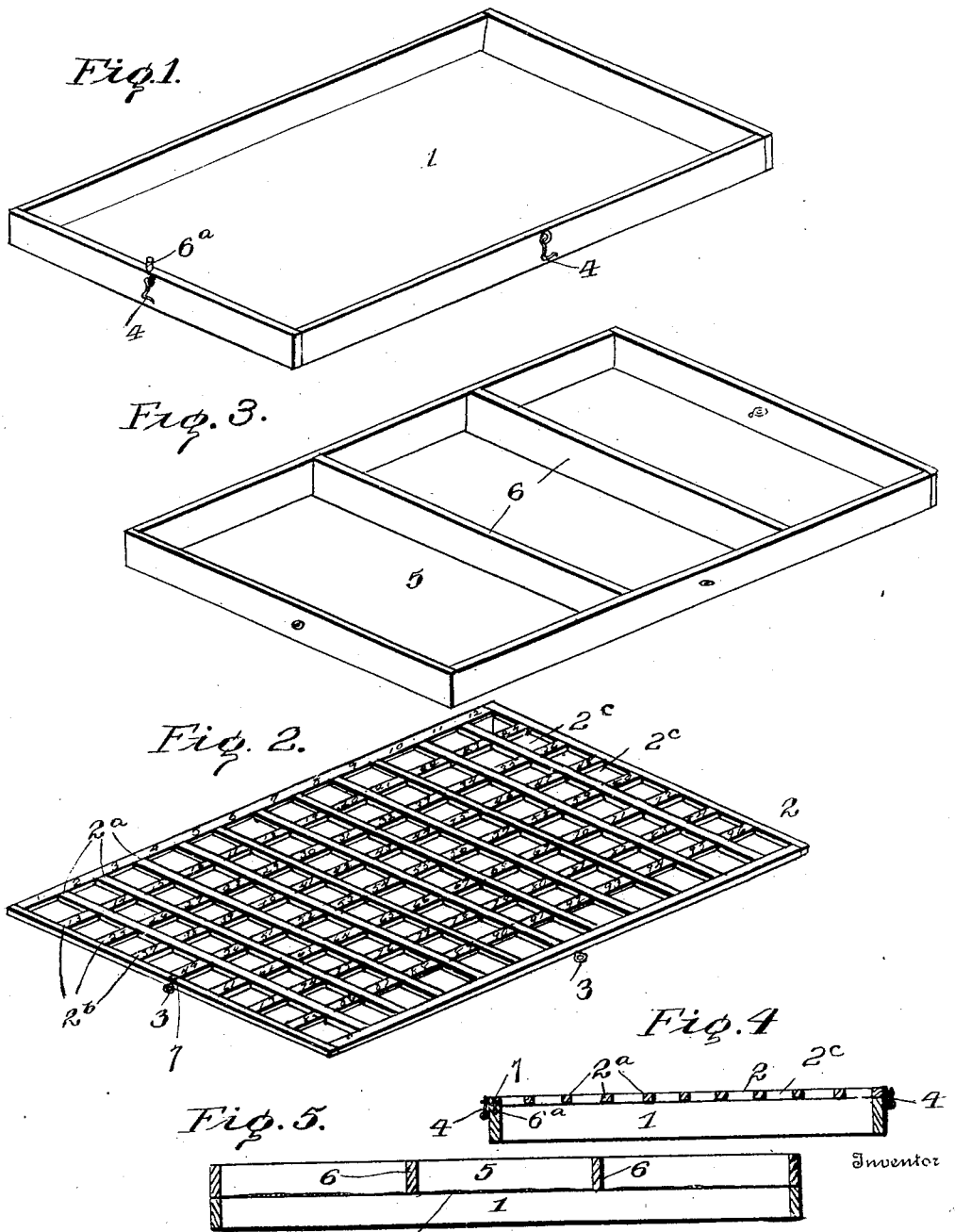

WILLIAM ULBRICH, OF ATLANTIC, IOWA.

SEED-TESTING APPARATUS.

No. 823,088.  Specification of Letters Patent.  Patented June 12, 1906.

Application filed September 12, 1905. Serial No. 278,170.

*To all whom it may concern:*

Be it known that I, WILLIAM ULBRICH, a citizen of the United States, residing at Atlantic, in the county of Cass and State of Iowa, have invented certain new and useful Improvements in Seed-Testing Apparatus, of which the following is a specification.

This invention relates to apparatus for testing the germinating qualities of seeds.

For a full description of the invention and the merits thereof and also to acquire a knowledge of the details of construction of the means for effecting the result reference is to be had to the following description and accompanying drawings, in which—

Figure 1 is a perspective view of the main soil-receptacle. Fig. 2 is a view of the spacing-frame. Fig. 3 is a perspective view of the auxiliary soil-receptacle. Fig. 4 is a longitudinal sectional view of the main soil-receptacle with the spacing-frame in position thereon. Fig. 5 is a longitudinal sectional view showing the auxiliary soil-receptacle disposed on the main soil-receptacle.

Corresponding and like parts are referred to in the following description and indicated in all the views of the drawings by the same reference characters.

In the practical embodiment of this invention the testing apparatus comprises a main soil receptacle or box, (indicated 1,) and this receptacle may be of any suitable size, dependent especially upon the number of different varieties of seeds which are to be tested, being preferably of rectangular outline, though not necessarily so. The receptacle 1 is adapted to hold soil or earth in quantity. The seeds of the different varieties to be tested are to be disposed on the earth or soil of the box or receptacle 1, and in order that the said varieties may not become mixed, but be located so as to be accurately indicated, it is designed to use a spacing or registering frame, (indicated at 2,) which frame is composed of sides connected by longitudinal and transverse spacing-bars $2^a$ and $2^b$, respectively. The frame 2 is preferably of the same size as the receptacle 1 and may be disposed thereon, with the sides of said frame resting upon the sides of the receptacle. Suitable eyes 3 at the ends of the frame 2 are adapted to be engaged by hooks 4 at opposite ends of the receptacle 1, so that the frame 2 may be securely fastened thereto. Any other suitable fastening means may be utilized for the purpose, however. The various spaces which are formed by the crossing longitudinal and transverse bars $2^a$ and $2^b$ of the frame 2 are designated by numerals or any similar characters by which they may be denoted, and thus the spaces are separated so as to be distinguished from one another.

In actual use the frame 2 is disposed on the receptacle 1 after the latter has been filled with earth or soil, and the seeds of the different varieties to be tested will be laid on the earth in the receptacle 1 in the spaces formed by the several bars $2^a$ and $2^b$, said bars preventing the seeds from being mixed in an obvious way. The spaces in which the varieties of seeds are disposed are indicated by numerals or the characters applied to the bars $2^a$. The invention is particularly designed for testing the seeds of ear-corn, and when several seeds have been removed from an ear and placed in one of the spaces of the frame 2 the ear will be laid upon a shelf or suitable support. The seeds of another ear from which kernels or seed are secured will be placed in the next space, and said ear will be arranged alongside the ear already placed on the shelf, so that its position relative to the first ear will be the same as that of the seeds in the second space relative to the seeds in the first space above mentioned, and so on. The different kernels or seeds having been placed on the soil or earth in the receptacle 1 in the various spaces $2^c$, the frame 2 is removed, and an auxiliary receptacle 5 is now placed in position on the receptacle 1. The receptacle 5 is composed of sides and is provided with a bottom $5^a$, of fabric or foraminous material, such as cloth or wire screen, respectively. The sides of the receptacle 5 may be connected by cross-bars 6 to secure the bottom thereto in a more substantial way. The receptacle 5 when filled with earth and laid upon the receptacle 1 after the removal of the frame 2 will cover the seed in said receptacle 1 with earth, so that they may germinate in the customary manner. Receptacle 5 is likewise provided with suitable eyes or loop members formed at its ends and sides, which may be engaged by the hooks 4 on the receptacle 1, so that the receptacle 5 will be substantially held in position. After a certain period of time the receptacle 5 will be removed from the receptacle 1, the seeds in the receptacle 1 having germinated, and the frame 2 will be again placed in position on the receptacle 1, so that the spaces in which the different kernels or seeds in the receptacle 1 will be clearly indicated. It will be easy for the operator to note the seeds possessing the best germinating qualities, and the ear of corn which carries said seeds may be readily selected, as said ear is arranged in a position relative to the other ears, as the space in which its seeds were placed in the receptacle 1 is in relative position to the other spaces, as above described. In order that the frame 2 may always be disposed in its proper position upon the box 1, it is designed that a pin 6ª shall be projected upwardly from a side of the box 1 to enter an opening 7 in a side of the frame 2.

From the foregoing it will be noted, so far as the practical adaptation of the invention with regard to testing the seed of ear-corn, that a farmer by the use of the apparatus is enabled to test his seed-corn before planting time and select only those ears which will germinate, thereby securing a full stand of corn, while he depended formerly upon his judgment in selecting the seed. By testing a few kernels of each ear of corn he can readily find out which seed will not grow and the practical results will be apparent. The invention is applicable, however, to testing seed of different varieties of a species whether the seed be of ear-corn or seed in packages or the like. The broad essence of the invention resides in the special apparatus used, whether it be applied for testing any particular varieties of seed of a certain kind or germinating qualities of seeds of different kinds.

Having thus described the invention, what is claimed as new is—

1. A seed-testing apparatus, comprising a main soil-receptacle designed to receive the seeds to be tested, an auxiliary soil-receptacle provided with a foraminous bottom and designed to rest on the main receptacle while the seeds are germinating and to be removed therefrom to ascertain the condition of the seeds, and a removable indicating-frame divided into a plurality of spaces designed to be placed on the main soil-receptacle while the seeds are being deposited therein and also subsequent to the removal of the auxiliary receptacle.

2. A seed-testing apparatus, comprising a main soil-receptacle designed to receive the seeds to be tested, an auxiliary soil-receptacle provided with a foraminous bottom and designed to rest on the main receptacle while the seeds are germinating and to be removed therefrom to ascertain the condition of the seeds, a removable indicating-frame divided into a plurality of indicated spaces designed to be placed on the main soil-receptacle both while the seeds are being deposited therein and also subsequent to the removal of the auxiliary receptacle, and registering devices on the main soil-receptacle and said frame respectively, whereby the proper end-for-end positioning of said parts will be indicated.

In testimony whereof I affix my signature in presence of two witnesses.

WILLIAM ULBRICH.

Witnesses:
   H. M. BOORMAN,
   ROY L. NANCOLLY.